United States Patent [19]
Zerber

[11] Patent Number: 5,951,636
[45] Date of Patent: Sep. 14, 1999

[54] ACCESSING A POST OFFICE SYSTEM FROM A CLIENT COMPUTER USING APPLETS

[75] Inventor: Kevin Gregory Zerber, Redwood City, Calif.

[73] Assignee: International Business Machines Corp., Armonk, N.Y.

[21] Appl. No.: 08/984,750

[22] Filed: Dec. 4, 1997

[51] Int. Cl.[6] ................................................. G06F 13/00
[52] U.S. Cl. ..................................... 709/202; 395/200.36
[58] Field of Search .................................. 709/202, 206, 709/204, 203

[56] References Cited

U.S. PATENT DOCUMENTS

| | | | |
|---|---|---|---|
| 5,437,022 | 7/1995 | Beardsley et al. | 711/120 X |
| 5,479,411 | 12/1995 | Klein | 379/88.13 |
| 5,675,507 | 10/1997 | Bobo, II | 395/200.36 |
| 5,765,033 | 6/1998 | Miloslavsky | 395/200.36 |

*Primary Examiner*—Ly V. Hua
*Attorney, Agent, or Firm*—Merchant & Gould

[57] ABSTRACT

Disclosed is a system for accessing a folder of messages in a mail server, such as an inbox folder, outbox folder, draft message folder, etc. This disclosed system is especially suited for "offline" type protocols, such as POP3. A client computer establishes a first connection with a mail server including the folder of messages over a network. The client computer communicates a command to the mail server to parse messages in the folder to obtain message headers. The message headers are then downloaded to the client computer. After downloading the message headers, the first connection between the client computer and the mail server is terminated. The client computer may then be used to select at least one displayed header. After message headers are selected, a second connection is established between the client computer and the mail server. The client computer communicates a command to the mail server to retrieve a body for each message whose header was selected. The selected message bodies are then downloaded to the client computer. After downloading message bodies, the client computer communicates a command to the mail server to delete the selected messages from the folder in the mail server. The client computer then communicates a command to the mail server to terminate the second connection between the client computer and the mail server.

23 Claims, 6 Drawing Sheets

FIG. 5

ACCESSING A POST OFFICE SYSTEM FROM A CLIENT COMPUTER USING APPLETS

CROSS-REFERENCE TO RELATED APPLICATIONS

This application is related to the following co-pending and commonlyassigned application:

Application Ser. No. 08/985,428, filed on the same date herewith, by Kevin G. Zerber, entitled "Inter-Applet Communication Within a Web Browser," attorney's docket number L09-97-035, which is incorporated herein by reference in its entirety.

BACKGROUND OF THE INVENTION

1. Field of the Invention

The present invention relates generally to a system for accessing a post office system with a remote computer using downloaded applets and, more specifically, to a system for selectively downloading messages from the post office system.

2. Description of the Related Art

An electronic post office system maintained within a network file server allows multiple computer users linked to the network file server to transmit electronic messages to each other. A message is the basic unit of exchange in the post office system. A message can include file attachments such as text, graphics, sounds, binary files, electronic forms, fax pages or any other data objects. The post office is the central repository for all messages and is typically implemented in a database system in the network file server. The post office has a mail directory, which lists all the people, post offices and gateways for message exchange. Each user maintains an individual mailbox within the post office system, which might include an inbox of incoming messages, drafts of text messages not yet sent, an outbox of sent messages, trash folders of deleted messages, etc. Each user in the post office system has an assigned name which is used to identify and route mail to the user.

Figure 1:
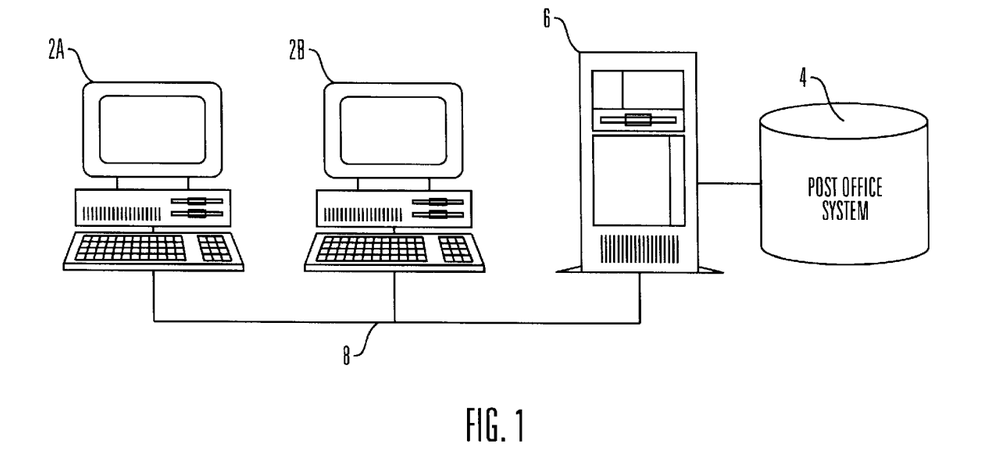
FIG. 1 is a block diagram that illustrates the relationship between a client computer and a post office system linked via a network, which is known in the prior art.
Figure 2:
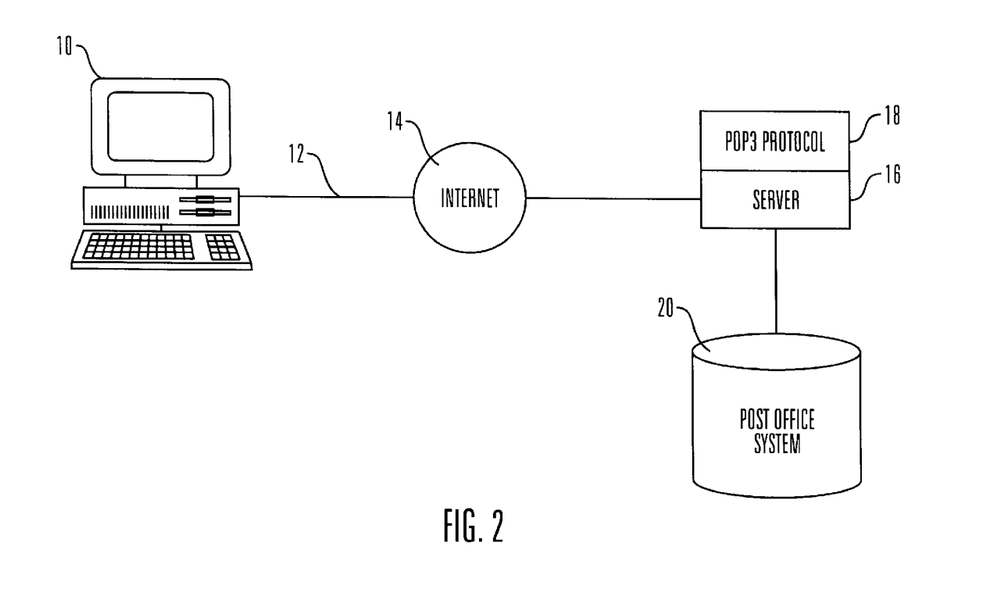
FIG. 2 is a block diagram that illustrates the relationship between a client computer and a post office system linked via the Internet, which is known in the prior art.

FIG. 1 illustrates how client computers 2a, 2b access a post office system 4 within a server computer 6 via a network connection 8 (e.g., LAN, WAN, etc.). FIG. 2 illustrates how a computer 10 at a remote location can connect to a post office system 20 via a TCP/IP connection 12 and the Internet 14. The post office system 20 is included in a server 16 which runs the POP3 protocol 18. A protocol is used to regulate communication between the client computer and the post office system. Protocols which regulate the flow of messages to a post office system via the Internet include the Post Office Protocol version 3 (POP3), as shown in FIG. 2, the Internet Message Access Protocol version 4 (IMAP4), Lightweight Directory Access Protocol (LDAP), etc. Both the client and post office system must use compatible protocols. For instance, software programs such as Netscape Navigator, Eudora Pro, and Microsoft Internet Explorer include the POP3 protocol, thereby allowing a client computer running these programs to access a post office system compatible with POP3.

In prior art systems, the client computer must include software using a mail protocol compatible with the protocol for the post office system. Thus, if a client computer has software running the POP3 protocol, but not IMAP4, then such client computer will not be able to access a post office server only compatible with IMAP4. Prior art systems thus require users to make sure that they have installed software including a protocol compatible with the protocol used in the post office system they want to access before they attempt to access the post office system.

The IMAP4 protocol provides "online" manipulation of messages in the mail server and leaves the messages on the server. With IMAP4, users can remotely access the post office system, draft messages, view messages, and manage and manipulate post office files and folders locally within the server. The POP3 protocol and other similar proprietary protocols, on the other hand, provide "offline" manipulation of messages. With POP3, the remote client computer downloads and deletes all the messages from the post office system. In POP3, all message processing is local to the client computer.

Although, presently, the POP3 protocol is more widely used than IMAP4, IMAP4 is a more efficient protocol because IMAP4 minimizes data transfer time. With IMAP4, the remote client computer may review messages stored in the post office system and selectively download only desired messages. In this way, data transfer is limited to only those messages the user wants to download. On the other hand, with the POP3 protocol, the remote client computer must download all messages, even those the user has no interest in downloading. Thus, POP3 maximizes data transfer time and needlessly consumes client computer system resources.

SUMMARY OF THE INVENTION

To overcome the limitations in the prior art described above, the present invention discloses a system for accessing a folder of messages. A client computer establishes a first connection with a mail server including the folder of messages over a network. The client computer communicates a command to the mail server to parse messages in the folder to obtain message headers. The message headers are then downloaded to the client computer. After downloading the message headers, the first connection between the client computer and the mail server is terminated. The client computer may then be used to select at least one displayed header. After message headers are selected, a second connection is established between the client computer and the mail server. The client computer communicates a command to the mail server to retrieve a body for each message whose header was selected. The selected message bodies are then downloaded to the client computer. After downloading message bodies, the client computer communicates a command to the mail server to delete the selected messages from the folder in the mail server. The client computer then communicates a command to the mail server to terminate the second connection between the client computer and the mail server.

In further embodiments, to establish the first connection, the client computer communicates with a second server via the network using a first protocol to download a first applet from the second server into the client computer. The first applet is executed in the client computer and performs the steps of: (1) establishing the first and second connections between the client computer and the mail server via the network using a second protocol; (2) displaying information in at least one of the message headers and message bodies downloaded from the mail server; and (3) generating and communicating the commands to the mail server.

It is an object of the present invention to minimize data transfer time under a mail protocol, such as POP3, that employs an "offline" mail protocol access scheme.

It is a further object of the present invention to provide a system for accessing a post office system from a remote client computer using a downloaded applet, wherein the remote client computer may display information on messages in the post office system without downloading the entire message.

It is a further object of the present invention that the downloaded applet include a protocol which is compatible with a communication protocol used by the post office system, wherein the remote client computer operates under control of the applet to access the post office system in accordance with the protocol.

It is a yet further object of the present invention to download more than one applet to configure the remote client computer to perform functions such as downloading files from the post office system, displaying messages, and creating new messages which may be transmitted to the post office system.

These and various other features as well as advantages which characterize the present invention will be apparent upon reading of the following detailed description and review of the associated drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Description

Figure 3:
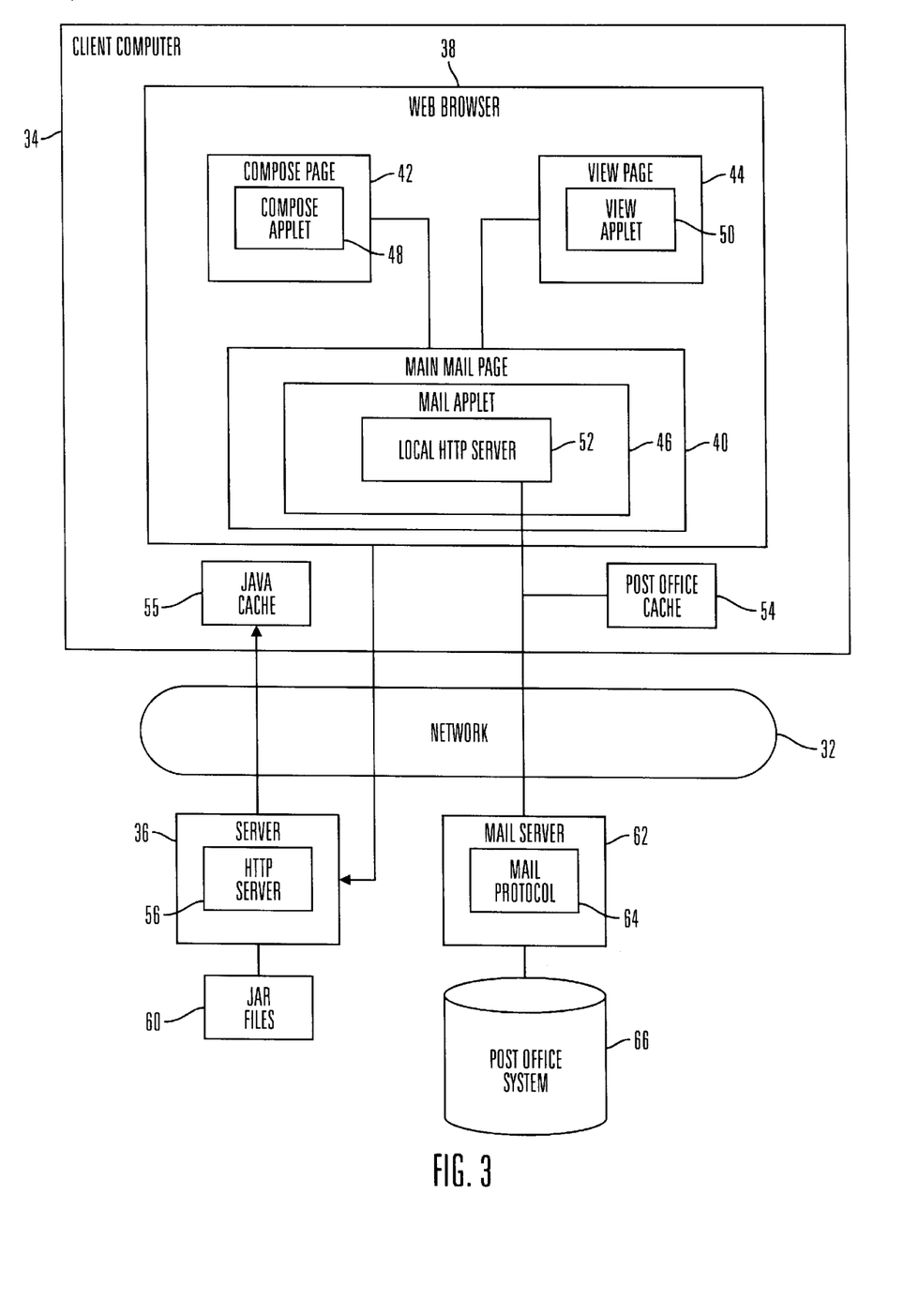
FIG. 3 is a block diagram that illustrates the relationship between a client computer, a post office system, and an HTTP server in accordance with the present invention.

FIG. 3 schematically illustrates the environment of the preferred embodiment of the present invention, and more particularly, illustrates a typical distributed computer system 30 using the Internet or other network 32 to connect a client computer 34 to a server 36 and a mail server 62. A typical combination of resources may include clients computers 34 that are personal computers, laptops, palmtops or workstations, and servers 36, 62 that are personal computers, workstations, minicomputers or mainframes. The network 32 may comprise networks such as LANs, WANs, SNA networks, and the Internet.

FIG. 3 illustrates further details of the client computer 34, the server 36, the mail server 62, and the interaction therebetween. In preferred embodiments, the client computer 34 includes a Hyper Text Mark-up Language (HTML) web browser 38 (e.g., IBM's Web Explorer, Netscape's Navigator, Sun Microsystem's HotJava Browser, Microsoft's Internet Explorer, etc.). In preferred embodiments, the client computer 34 further includes a Java™ platform which enables the client computer to execute programs written in the Java™ computer language. The Java™ Platform may be installed in the client computer 34 or may be embedded in the web browser 38 software. A computer that implements the Java platform is referred to as a Java virtual machine. The Java virtual machine hides the underlying operating system of the client computer 34 (e.g., Windows, Unix, AIX, Solaris, etc.) from Java based applets and applications. An applet is a generally small application program. The Java platform translates the Java based applets and applications to bytecodes which are understood by the underlying operating system of the client computer 34.

The web browser 38 can generate a main mail page 40, a compose page 42, and a view page 44. In preferred embodiments, the pages 40, 42, and 44 are HTML pages and each page 40, 42, 44 includes a Java™ applet. A mail applet 46, a compose message applet 48, and a view applet 50 run in pages 40, 42, 44, respectively, to display information in their respective pages 40, 42, 44. The mail applet 46 causes the web browser 38 to display portions of the main mail page 40, which provides access to various mail box folders and features, such as an inbox folder, an outbox folder, a draft message folder, a message composition template, etc. The mail applet 46 further creates a thread to run a local Hyper Text Transport Protocol (HTTP) server 52. The compose applet 48, which runs in the compose page 42, causes the web browser 38 to display portions of the compose page 42, which provides a template to compose new messages, and reply to and forward received messages. The view applet 50, which runs in the view page 44, causes the web browser 38 to display portions of the view page 44 in which the user may read and view the content of messages.

In preferred embodiments, the mail applet 46 is executed first to display the main mail page 40 including various mail box features. When the user selects to view or read a message, the mail applet 46 opens the view page 44, which includes the view applet 50. Similarly, when the user selects to compose, reply to or forward a message, the mail applet 46 opens the compose page 42, which includes the compose applet 48. In this way, in preferred embodiments, the applets and web pages are only loaded when needed.

The client computer 34 further includes a post office cache 54 and a Java cache 55. The post office cache 54 stores messages downloaded from the post office system 66 to the client computer 34. The Java cache 55 stores the Java files, applets, and classes which are needed to implement the mail applet 46, compose applet 48, view applet 50, and all the functions thereof.

The server 36 includes an HTTP server 56 and Java Archive (JAR) Files 60 which store Java applets in a compressed format. The JAR files 60 are stored in a directory in the server 36 which is relative to a directory including the HTTP server 56. The HTTP server 56 receives a request from the client computer to access the post office system 66. The HTTP server 56 processes this request and transmits a web page to the client computer 34 with an embedded URL link to a JAR file in the JAR files 60 directory. When the web browser 38 of the client computer 34 opens the web page including the embedded link to a JAR file in the server 36, the web browser 38 then transmits to the HTTP server 56 a request for the JAR file. The HTTP server 56 processes this request and retrieves the requested JAR file to download to the client computer 34 via the network 32 for storage in the Java cache 55. In preferred embodiments, the applets 46, 48, 50 are stored within a single JAR file downloaded to the client computer 34.

The present invention further includes a mail server 62 which may be a mainframe, minicomputer, workstation or personal computer. The mail server 62 runs a mail protocol 64 (e.g., POP3, IMAP4, SMTP, LDAP, etc.) and a post office system 66 (e.g., Lotus cc:Mail, Lotus Notes, Lotus Domino, Novell's Groupwise, etc.). In preferred embodiments, the protocol which allows the client computer 34 to communicate with the post office system 66 is maintained in the mail applet 46. Thus, the mail applet 46 runs a protocol compatible with the mail protocol 64 in the mail server 62, e.g., POP3, IMAP4, etc. In this preferred embodiment, the mail applet 46 provides the only socket link to the post office system 66 for the client computer 34.

Thus, the present invention may be implemented as a method, apparatus, or article of manufacture using standard programming and/or engineering techniques to produce software, firmware, hardware, or any combination thereof. The term "article of manufacture" as used herein is intended to encompass any device, carrier, or media that provides access to instructions and/or data useful in performing the same or similar functionality.

Those skilled in the art will recognize that the exemplary environment illustrated in FIG. 1 is not intended to limit the present invention. Indeed, those skilled in the art will recognize that other alternative hardware environments may be used without departing from the scope of the present invention. For instance, in alternative embodiments, the HTTP server 56, JAR files 60, mail protocol 64, post office system 66 or any combination thereof may be installed on a single computer server or over several servers distributed over a network.

Accessing the Post Office System

Figure 4A:
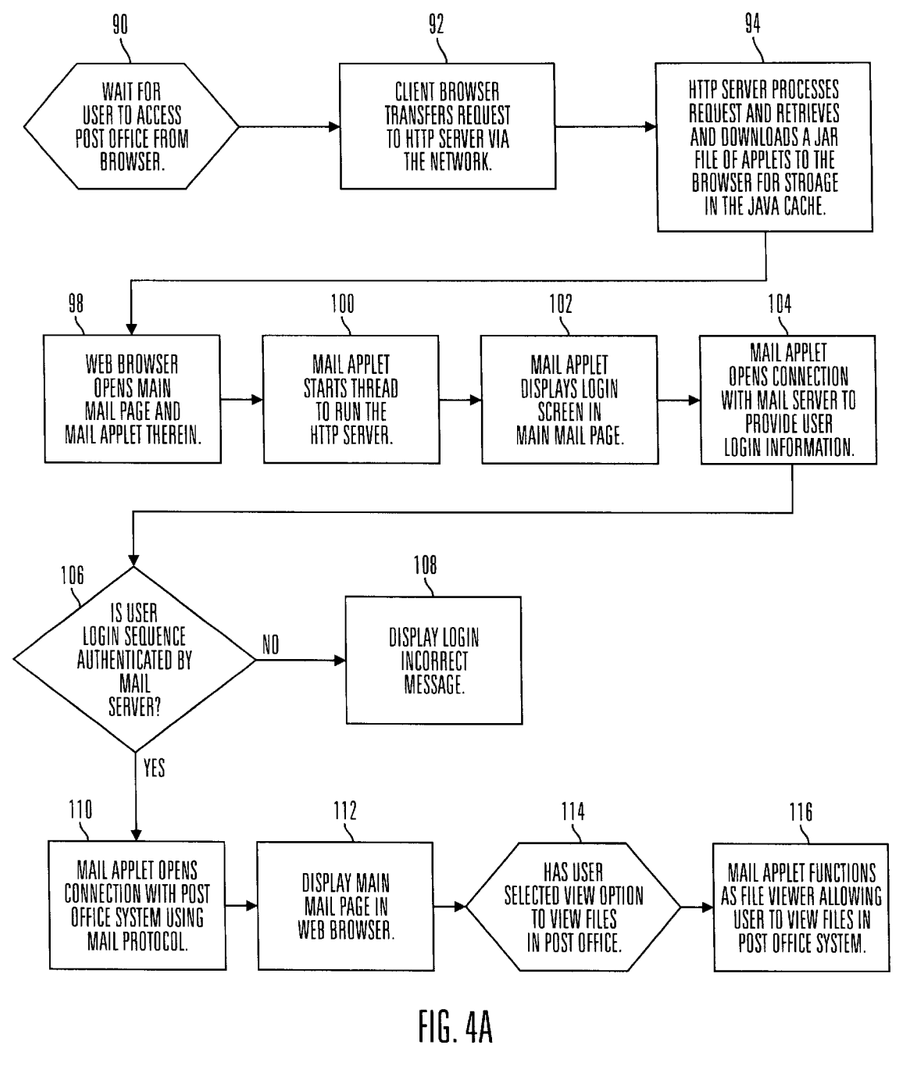
FIG. 4a is a flowchart that illustrates logic of how a client computer accesses a post office system in accordance with preferred embodiments of the present invention.
Figure 4B:
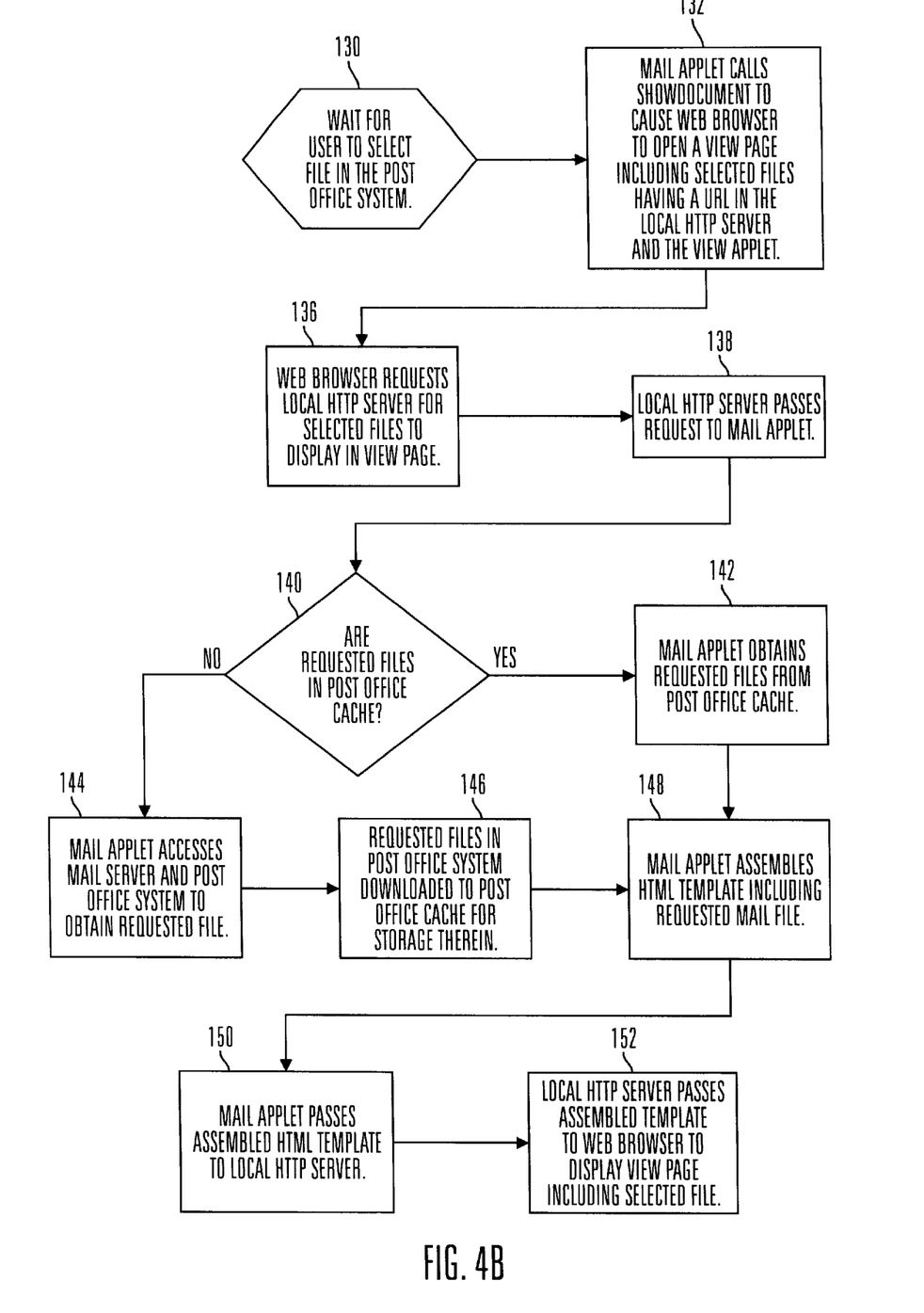
FIG. 4b is a flowchart that illustrates logic of how a user at a client computer selects a file in a post office system to view and download in accordance with preferred embodiments of the present invention.
Figure 4C:
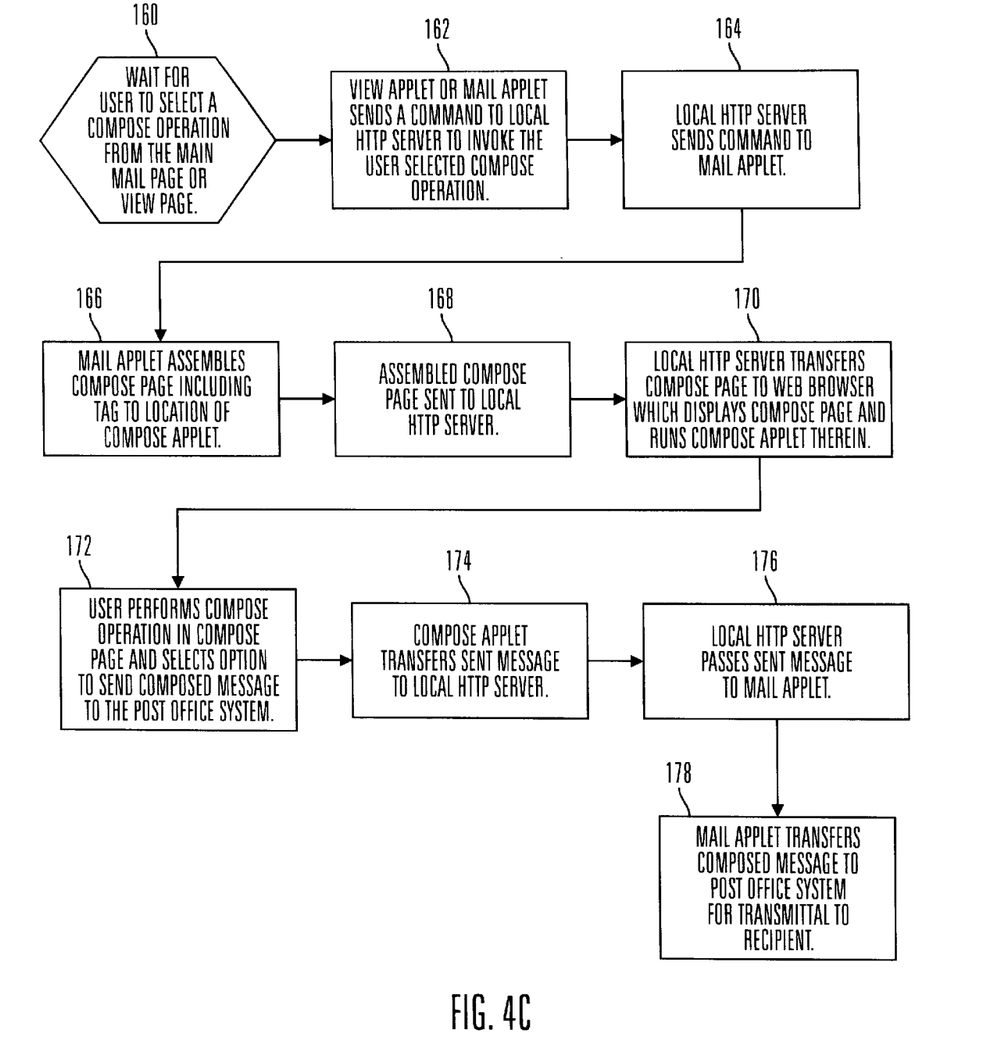
FIG. 4c is a flowchart that illustrates logic of how a user at a client computer composes messages for transmittal to a post office system in accordance with preferred embodiments of the present invention.

Flowcharts which illustrate preferred embodiments of the logic for accessing a post office system in accordance with the present invention are shown in FIGS. 4a, 4b, and 4c. Those skilled in the art will recognize that this logic is provided for illustrative purposes only and that different logic may be used to accomplish the same results.

FIG. 4a is a flowchart showing logic for how the client computer 34 initially accesses the post office system 66 in accordance with the present invention. At block 90, the system waits for a user to attempt to access the post office system 66 using the web browser 38. Control transfers to block 92 which represents the web browser 38 transferring a request to the HTTP server 56 via the network 32 to access the post office system 66. Control then transfers to block 94 which represents the HTTP server 56 processing the request and retrieving a JAR file including the three applets 46, 48, 50 and related programs and files. The HTTP server 56 transmits the retrieved JAR file to the client computer 34 for storage in the Java cache 55. As discussed, in preferred embodiments, the JAR file is downloaded by first downloading to the client computer 34 a web page with an embedded link to the JAR file. In preferred embodiments, the client computer 34 extracts the applets from the downloaded JAR file and stores the applets in the Java cache 55.

Upon downloading the JAR file and extracting the applets therein, control proceeds to block 98 which represents the web browser 38 opening the main mail page 40 and running the mail applet 46 stored in the Java cache 55 in page 40. Control transfers to block 100, which represents the mail applet 46 starting a new thread to run the local HTTP server 52. In preferred embodiments, the local HTTP server 52 would listen in on port 1110. In such case, the URL location for the local HTTP server 52 in the client computer 34 may be at http:\\localhost:1110. After invoking the main mail page 40 and the mail applet 46, control transfers to block 102 which represents the mail applet 46 displaying a login screen in the main mail page 40.

From block 102, control proceeds to block 104 which represents the mail applet 46 opening a connection with the mail server 62 to provide the user login information to the mail server 62. Control transfers to block 106, which represents the mail server 62, operating under control of the mail protocol 64, authenticating the user login information. If the user login information is not authenticated, control transfers to block 108; otherwise control transfers to block 110. Block 108 represents the mail applet 46, upon receiving indication of authentication failure from the mail server 62, displaying a login incorrect message in the main mail page 40. Block 110 represents the mail applet 46, upon receiving indication of authentication, opening a connection with the post office system 66 using the mail protocol 64. As discussed, the mail applet 46 includes a mail protocol compatible with the mail protocol 64 employed in the mail server 62. Control transfers to block 112 which represents the web browser 38 displaying in the main mail page 40 graphical representations of common e-mail program features, e.g., an inbox, outbox, trash, message composition options, etc.

Control then transfers to block 114, which represents the client computer 34 waiting for the user to select a view option from the main mail page 40. Upon receiving such a request, control transfers to block 116, which represents the mail applet 46 functioning as a file viewer to allow the user to traverse and view information on files in the post office system 66. The user may view information on the files in the post office system without downloading such files. In preferred embodiments, a user logged into the post office system 66 is restricted to only viewing files in such user's mailbox and not files in other users' mailboxes.

FIG. 4b illustrates a preferred embodiment of logic for allowing the user to select a file in the post office system 66 to view and download to the client computer 34 in accordance with the present invention. Block 130 represents the client computer 34 waiting for the user to select a file in the post office system 66. In preferred embodiments, the user would first view information on the files in the user mailbox in the post office system 66 in the manner discussed with respect to FIG. 4a. The user may select a viewed file with an input device attached to the client computer 34. For instance, if a mouse pointer is used as the input device, then the user may select a file in the post office system 66 by double-clicking the viewed file with the mouse pointer. Upon selecting a file at block 130, control proceeds to block 132 which represents the mail applet 46 using the Java™ showDocument command to cause the web browser 38 to open the view page 44 including the selected file. The view page 44 may reference the selected file using a Uniform Resource Locator (URL) name in the local HTTP server 56. For instance, if the user selects a message file in the post office system 66, the selected message may have the following URL in the local HTTP server 56:

http:\\localhost:1110/MESSAGExxxxx.xxxx

Control transfers to block 136 which represents the web browser 38 requesting the user selected file from the local HTTP server 56. To retrieve the user selected file included in the view page 44, the web browser 38 may issue a Java GET command, such as the following: GET MESSAGExxxxx.xxxx to retrieve the user selected message. Control transfers to block 138, which represents the local HTTP server 56 passing the request for the selected file to the mail applet 46. Control then transfers to block 140 which represents the mail applet 46 determining whether the selected file is already located in the post office cache 54. If so, control transfers to block 142; otherwise control transfers to block 144. Block 142 represents the mail applet 46 obtaining the requested file from the post office cache 54. Block 144 represents the mail applet 46 accessing the post office system 66 to obtain the selected file. Block 146 represents the mail server 62 downloading the selected file from the post office system 66 to the post office cache 54 in the client computer 34. In this way, files are only downloaded from the post office system 66 when unavailable in the cache 54, thereby minimizing downloading operations and time.

From blocks 142 and 146, control transfers to block 148 which represents the mail applet 46 assembling an HTML template including tags to the selected file already stored in the post office cache 54 or downloaded from the post office system 66. An example of an HTML template (1) for the view page 44 that the mail applet 46 would assemble is provided below. In this example (1), the user selected message is identified as 863822044.000.

(1) <html>
   <frameset rows="20%,80%">
   <frameset cols="60%,40%">
   <framename="HeaderArea"src="http://localhost:1110/HEADER+86382 2044.000">
   <frame name="AttachmentArea" src="http://localhost:1110/ATTACHMENTS+863822044.000">
   </frameset>
   <frame name="ContentArea" src="http://localhost:1110/BODY+863822044.000">
   <frame name="ControlArea" src="http://localhost:1110/CONTROLS+863 822044.000">
   </frameset>
   </html>

The selected message includes four separate component files, HEADER, ATTACHMENTS, BODY, and CONTROLS. These four separate components of the selected message (863822044.000) were downloaded to the post office cache 54 at blocks 144 and 146 and are identified by a URL in the local HTTP server 56. The HTML template (1) in the above example creates four frames within the view page 44. Each frame in the view page 44 tags the URL for one of the above four component files to display in that frame. The "HEADER" is a plain text document that includes message information, such as the author, recipients and subject of the message. "ATTACHMENTS" is an HTML document that contains a list of URL links to the actual attachments to the message. An example (2) of an ATTACHMENT HTML page displayed in one of the frames of the view page 44 is provided below:

(2) <html><body>
   # parts: 2<p>
   <a href="http://localhost:1110/PART+863822044.000+0" target="ContentArea">0: null: text/plain
   </a><p>
   <a href="http://localhost:1110/PART+863822044.000+1" target="ContentArea">1: null: text/html
   </a><p>
   </body></html>

The PART is the actual data for each part of the mime message (or attachment). The BODY is the main text of the message, and may be plain text or an HTML file. CONTROLS is an applet that generates a control panel of icons representing various compose operations discussed below. The user can select one of the operations from the control panel to reply or forward the message displayed in the other frames of the view page 44. Selection of a compose operation spawns the compose page 42 in the manner discussed below.

Thus, the view page 44 generated by the HTML template (1) in the above example displays a header for the message in one frame, the body of the message in a second frame, information on any additional attachments to the message in a third frame, and icons representing various compose operations, which provide a link to the compose page 42, in the fourth frame.

From block 148, control transfers to block 150 which represents the mail applet 46 passing the assembled HTML template for the view page 44 to the local HTTP server 52. Control transfers to block 152 which represents the local HTTP server 52 passing the assembled template to the web browser 38 to display the view page 44 and selected file, which in the above example is the contents of the selected message.

FIG. 4c illustrates a preferred embodiment of the logic for performing compose operations, such as composing new messages, replying to messages, and forwarding messages. The compose page 42 can be invoked from the main mail page 40 or from the frame in the view page 44 running the CONTROLS applet. Block 160 represents the client computer 34 waiting for the user to invoke a compose operation from the main mail page 40 or view page 44. In preferred embodiments, the user may perform the following compose operations: creating a new message; forwarding a message; replying to the sender of the message; replying to all addressees in a message; replying to the sender with the message included; replying to all addressees with the message included; deleting the message; and printing the message. Many of these operations, such as forwarding and replying, may only be invoked from within the view page 44 while a selected message is displayed.

Control transfers to block 162 which represents the view applet 50 or mail applet 46 transferring a command corresponding to the selected compose operation to the local HTTP server 52. Below is list of HTTP commands used to initiate compose operations:

CREATE: Creates a message.
FORWARD: Forwards a message.
REPLYTOSENDER: Compose new message to reply to sender of message.
REPLYTOALL: Replies to all addressees in a message.
REPLYTOSENDERWITHMESSAGE: replies to sender with message included.
REPLYTOALLWITHMESSAGE: Replies to all addressees with the message.

DELETE: Deletes a message.

PRINT: Prints a message.

The mail applet 46 or view applet 50 would send one of the above commands corresponding to the user selected operation. From block 162, control transfers to block 164 which represents the local HTTP server 52 transferring the command to the mail applet 46. Control transfers to block 166 which represents the mail applet 46 assembling a compose page 42 including the compose applet 48 to perform the user selected compose operation. If the user had invoked the compose operation while viewing a message in the view page 44, the mail applet 46 may include the viewed message or information thereon in the assembled compose page 42. In such instance, the compose operation relates to the message the user was previously viewing. After assembling the compose page 42, control transfers to block 168 which represents the mail applet 46 sending the compose page 42 to the local HTTP server 52. Control transfers to block 170, which represents the web browser 38 displaying the assembled compose page 42 and running the compose applet 48 therein.

Control then transfers to block 172 which represents the user performing the selected compose operation in the compose page and selecting to send a composed message to the post office system 66. If the user had selected compose operations such as deleting or printing a message, then the send option may not be available. However, if the send option is available and was selected, control transfers to block 174 which represents the compose applet 48 transferring the sent message to the local HTTP server 52. Control then transfers to block 176 which represents the local HTTP server 52 transferring the sent message to the mail applet 46, which, at block 178, transfers the sent message to the post office system 66 via the network 32.

In further embodiments, multiple compose pages 42 and view pages 44 may be opened in the web browser 38 at the same time. To implement multiple pages, the compose 48 and view 50 applets would include an argument for a code which identifies the current message opened in the compose 42 or view 44 page running the compose 48 or view 50 applet, respectively. This way, the compose 48 or view 50 applet running in a page will recognize which message it is operating on.

Accessing the Post Office System Using the POP3 Protocol

Preferred embodiments of the present invention allow the user to selectively download mail messages from the post office system 66 using the POP3 protocol or a similar "offline" mail protocol scheme. As discussed, in prior art post office systems utilizing the POP3 or similarly offline type protocols, when users access their mail box within the post office system 66, all the messages in the inbox are downloaded and subsequently deleted from the post office system 66. The preferred embodiment utilizes the POP3 protocol to allow the user to selectively download messages, thereby minimizing data transfer time to only those messages and files the user is interested in downloading.

Figure 5:
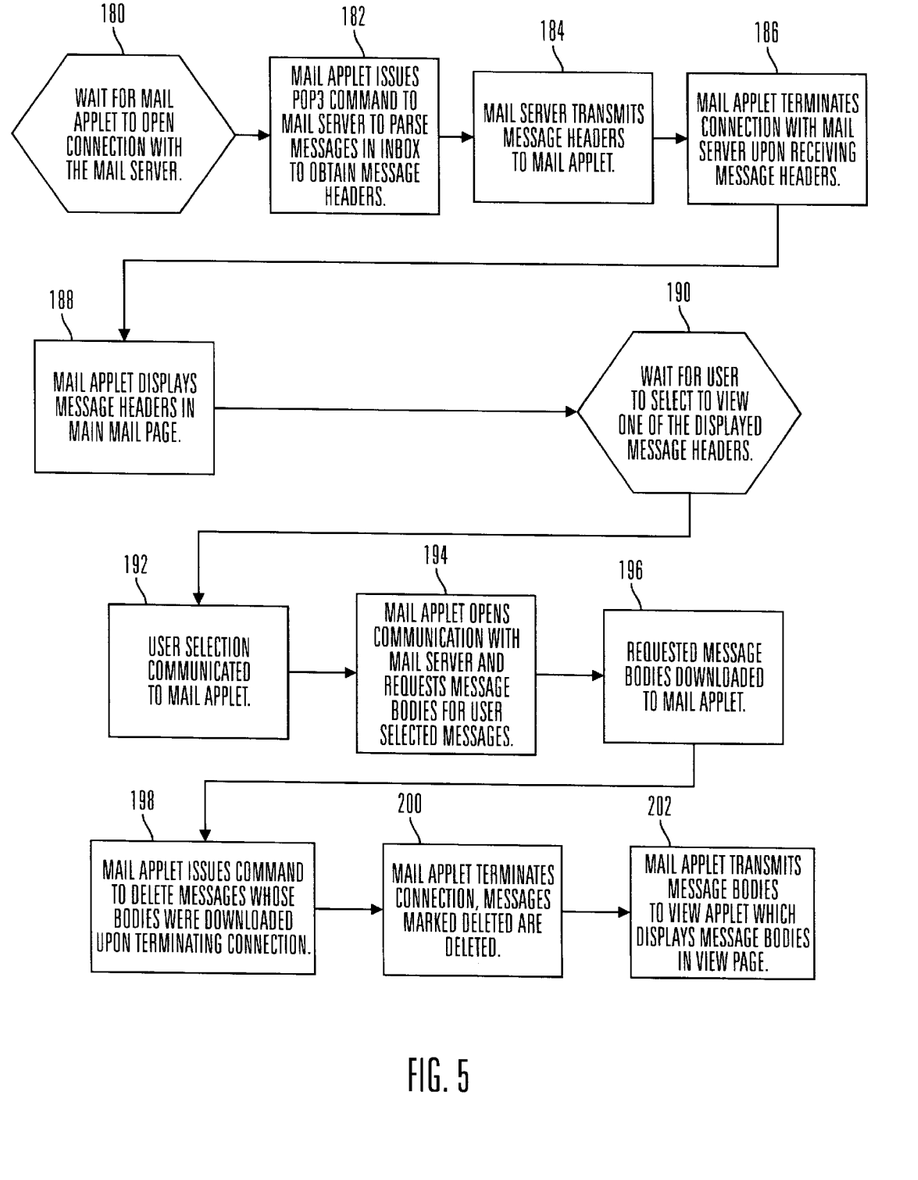
FIG. 5 is a flowchart that illustrates logic of how a client computer accesses a post office system utilizing an offline mail protocol in accordance with preferred embodiments of the present invention.

FIG. 5 is a flowchart that illustrates a preferred embodiment of logic implemented in the client computer 34 to retrieve messages from a folder in the post office system 66, such as an inbox folder, outbox message folder, draft message folder, bulletin board, etc., using the POP3 protocol or a similar offline protocol. The flowchart begins at block 180 which represents the client computer 34 waiting for the mail applet 46 to establish a connection with the mail server 62. Control transfers to block 182 which represents the mail applet 46 issuing a POP3 or similar protocol command to the mail server 62 to look-up messages added to a folder, such as the inbox, and obtain the headers for such new messages added to the folder. The POP3 command would parse the messages in the selected folder to obtain the header. For instance, the POP3 protocol includes the TOP command to retrieve a portion of a specified message from the post office system. The TOP command receives two arguments, the message number and the number of lines in the message body beyond the header.

Control then transfers to block 184 which represents the mail server 62 transmitting the parsed message headers from the post office system 66 to the mail applet 46. Control transfers to block 186 which represents the mail applet 46 issuing a command to terminate the connection with the mail server 62. In POP3 and other similar offline protocols, after downloading message information, the connection is terminated. The downloaded messages are stored in the post office cache 54 in the client computer 34. Control proceeds to block 188 which represents the mail applet 46 displaying the received message headers in the main mail page 40. In further embodiments, the message headers may be displayed in the view page 44. Control then transfers to block 190 which represents the client computer 34 waiting for the user to select one of the displayed message headers.

Upon user selection of at least one message header, control transfers to block 192 which represents the user selections communicated to the mail applet 46. Control then proceeds to block 194 which represents the mail applet 46 establishing communication with the mail server 62 and requesting the message bodies for the user selected message headers. The mail applet 46 would issue a command such as the POP3 RETR command to retrieve the body of the selected messages. Block 196 represents the mail server 62 downloading the selected messages. After receiving the selected message bodies, control transfers to block 198 which represents the mail applet 46 communicating a command to mark the retrieved messages as deleted, which in POP3 is the DELE command. The deleted messages are deleted from the post office system 66 when the connection between the client computer 34 and mail server 62 is terminated. Control transfers to block 200 which represents the mail applet 46 terminating the connection with the mail server 62 and the mail server 62 deleting the messages from the post office system 66 marked as deleted. Control then transfers to block 202 which represents the mail applet 46 transmitting the received message bodies to the view applet 50 which displays the message bodies in the view page 44 for the user to read.

In this way, preferred embodiments utilize the POP3 protocol in a manner that minimizes data transfer time. Mail box manipulation remains local to the client computer 34 as with the POP3 protocol, but data transfer time is minimized by selectively downloading only selected message bodies. The POP3 commands are described in the Internet Engineering Task Force (IETF), Request for Comments No. 1939, by John G. Myers and Marshall T. Rose, incorporated herein by reference in its entirety.

Conclusion

This concludes the description of the preferred embodiments of the invention. The following describes some alternative embodiments for accomplishing the present invention.

Preferred embodiments were described with respect to the POP3 mail protocol. However, similar proprietary "offline" mail protocols would also benefit from the present invention.

In alternative embodiments, the applets may be downloaded from a server other than an HTTP server and may be in a format different from the JAR format described above.

In still further embodiments, the functions described with respect to the mail applet, the compose applet, and the view applet may be performed by one or more applets in a manner different than the manner described above. Moreover, the local HTTP server may be spawned in the web browser outside of the page including the main applet.

In addition, those skilled in the art will appreciate that the present invention is not limited by a specific programming language. The applets may be implemented in other programming languages, such as C, C++, PERL, Cobol, Smalltalk, etc.

Still further, the compose, view, and main mail page may be implemented in formats other than the HTML formats described above and the applets may communicate by a means other than the local HTTP server design described above.

Although the present invention is described with respect to a post office system, those skilled in the art will appreciate that the present invention may be used to access a database system, other than a post office system, from a remote computer over a network. In such case, the user may utilize the applets and preferred embodiments discussed with respect to the post office system to access and view information on files in the database system over the network, download viewed files, view the contents of downloaded files, and compose files at the remote location for transmittal to the database system.

In summary, the present invention discloses a system for accessing a n inbox of messages. A client computer establishes a first connection with a mail server including the inbox of messages over a network. The client computer communicates a command to the mail server to parse messages in the inbox to obtain message headers. The message headers are then downloaded to the client computer. After downloading the message headers, the first connection between the client computer and the mail server is terminated. The client computer may then be used to select at least one displayed header. After message headers are selected, a second connection is established between the client computer and the mail server. The client computer communicates a command to the mail server to retrieve a body for each message whose header was selected. The selected message bodies are then downloaded to the client computer. After downloading message bodies, the client computer communicates a command to the mail server to delete the selected messages from the inbox in the mail server. The client computer then communicates a command to the mail server to terminate the second connection between the client computer and the mail server.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing a folder of messages, comprising the steps of:
    (a) establishing a first connection between a client computer and a mail server including the folder of messages over a first network;
    (b) communicating a command from the client computer to the mail server to parse messages in the folder to obtain a message header;
    (c) downloading the message headers to the client computer;
    (d) terminating the first connection between the client computer and the mail server after downloading the message headers;
    (e) selecting with the client computer a displayed header;
    (f) establishing a second connection between the client computer and the mail server;
    (g) communicating a command from the client computer to the mail server to retrieve a body for each message whose header was selected;
    (h) downloading the selected message bodies to the client computer;
    (i) communicating a command from the client computer to the mail server to delete the selected messages from the folder in the mail server; and
    (j) communicating a command from the client computer to the mail server to terminate the second connection between the client computer and the mail server.

2. The method of claim 1, wherein the step of establishing the first connection between the client computer and the mail server further comprises the steps of:
    communicating between the client computer and a second server via the network using a first protocol;
    downloading a first applet from the second server into the client computer via the network using the first protocol; and
    executing the downloaded first applet in the client computer, wherein the executed first applet performs the steps of:
        (1) establishing the first and second connections between the client computer and the mail server via the network using a second protocol,
        (2) displaying information in at least one of the message headers and message bodies downloaded from the mail server; and
        (3) generating and communicating the commands to the mail server.

3. The method of claim 2, wherein the network is the Internet.

4. The method of claim 2, further including the step of downloading a second applet from the second server and executing the second applet in the client computer, and wherein the step of displaying information in at least one of the message headers and message bodies further comprises the steps of:
    communicating information in at least one of the message headers and message bodies from the first applet to the second applet; and
    generating with the second applet a page displaying the information communicated from the first applet.

5. The method of claim 4, further including the steps of:
    downloading a third applet from the second server using the first protocol;
    executing the third applet in the client computer;

generating with the third applet a second page displayed on the client computer;

creating a message by entering information with the client computer into the second page; and communicating the created message to the mail server using the second protocol.

6. The method of claim 5, wherein the step of transferring the created message to the mail server further comprises the steps of transferring the created message to the first applet and transferring the created message from the first applet to the mail server via the network using the second protocol.

7. The method of claim 2, further comprising the steps of:

downloading a second applet from the second server using the first protocol;

executing the second applet in the client computer;

generating with the second applet a page displayed on the client computer;

creating a message by entering information with the client computer into the second page; and communicating the created message to the mail server.

8. The method of claim 2, wherein the mail server and second server are located within a single computer system.

9. An apparatus for accessing a folder of messages, comprising:

(a) means for establishing a first connection between a client computer and a mail server including the folder of messages over a network;

(b) means for communicating a command from the client computer to the mail server to parse messages in the folder to obtain a message header;

(c) means for downloading the message headers to the client computer;

(d) means for terminating the first connection between the client computer and the mail server after downloading the message headers;

(e) means, performed by the client computer, for selecting a displayed header;

(f) means for establishing a second connection between the client computer and the mail server;

(g) means for communicating a command from the client computer to the mail server to retrieve a body for each message whose header was selected;

(h) means for downloading the selected message bodies to the client computer;

(i) means for communicating a command from the client computer to the mail server to delete the selected messages from the folder in the mail server; and (j) means for communicating a command from the client computer to the mail server to terminate the second connection between the client computer and the mail server.

10. The apparatus of claim 9, wherein the means for establishing the first connection between the client computer and the mail server further comprises:

means for communicating between the client computer and a second server via the network using a first protocol;

means for downloading a first applet from the second server into the client computer via the network using the first protocol; and means, performed by the first applet executed in the client computer, for:

(1) establishing the first and second connections between the client computer and the mail server via the network using a second protocol, (2) displaying information in at least one of the message headers and message bodies downloaded from the mail server; and (3) generating and communicating the commands to the mail server.

11. The apparatus of claim 10, wherein the network is the Internet.

12. The apparatus of claim 10, further including means for downloading a second applet from the second server and executing the second applet in the client computer, and wherein the means for displaying information in at least one of the message headers and message bodies further comprises:

means for communicating information in at least one of the message headers and message bodies from the first applet to the second applet; and means, performed by the second applet, for generating a page displaying information communicated from the first applet.

13. The apparatus of claim 12, further including:

means for downloading a third applet from the second server and executing the third applet in the client computer;

means, performed by the third applet, for generating a second page displayed on the client computer;

means, performed by the client computer, for creating a message by entering information into the second page; and means for communicating the created message to the mail server.

14. The apparatus of claim 13, wherein the means for transferring the created file to the mail server further comprises the steps of transferring the created file to the first applet and transferring the created file from the first applet to the mail server via the second network using the second protocol.

15. The apparatus of claim 10, further comprising:

means for downloading a second applet from the second server and executing the second applet in the client computer;

means, performed by the second applet, for generating a page displayed on the client computer;

means, performed by the client computer, for creating a message by entering information with the client computer into the second page; and means, performed by the first applet, for communicating the created message to the mail server.

16. The apparatus of claim 10, wherein the mail server and second server are located within a single computer system.

17. An article of manufacture for use in programming a client computer, the article of manufacture comprising a computer readable storage medium having a computer program embodied therein that causes the client computer to perform the steps of:

(a) establishing a first connection between the client computer and a mail server including the folder of messages over a network;

(b) communicating a command from the client computer to the mail server to parse messages in the folder to obtain a message header;

(c) downloading the message headers to the client computer;

(d) terminating the first connection between the client computer and the mail server after downloading the message headers;

(e) selecting with the client computer a displayed header;

(f) establishing a second connection between the client computer and the mail server;

(g) communicating a command from the client computer to the mail server to retrieve a body for each message whose header was selected;

(h) downloading the selected message bodies to the client computer;

(i) communicating a command from the client computer to the mail server to delete the selected messages from the folder in the mail server; and (j) communicating a command from the client computer to the mail server to terminate the second connection between the client computer and the mail server.

18. The article of manufacture of 17, wherein the step of establishing the first connection between the client computer and the mail server further comprises the steps of:

communicating between the client computer and a second server via the network using a first protocol;

downloading a first applet from the second server into the client computer via the network using the first protocol; and executing the downloaded first applet in the client computer, wherein the executed first applet performs the steps of:

(1) establishing the first and second connections between the client computer and the mail server via a second network using a second protocol;

(2) displaying information in at least one of the message headers and message bodies downloaded from the mail server; and (3) generating and communicating the commands to the mail server.

19. The article of manufacture of claim 18, wherein the network is the Internet.

20. The article of manufacture of claim 18, further including the step of downloading a second applet from the second server and executing the second applet in the client computer, and wherein the step of displaying information in at least one of the message headers and message bodies further comprises the steps of:

communicating information in at least one of the message headers and message bodies from the first applet to the second applet; and generating with the second applet a page displaying the information communicated from the first applet.

21. The article of manufacture of claim 20, further including the steps of:

downloading a third applet from the second server;

executing the third applet in the client computer;

generating with the third applet a second page displayed on the client computer;

creating a message by entering information with the client computer into the second page; and communicating the created message to the mail server.

22. The article of manufacture of claim 21, wherein the step of transferring the created file to the mail server further comprises the steps of transferring the created file to the first applet and transferring the created file from the first applet to the mail server via the second network using the second protocol.

23. The article of manufacture of claim 20, further comprising the steps of:

downloading a second applet from the second server;

executing the second applet in the client computer;

generating with the second applet a page displayed on the client computer;

creating a message by entering information with the client computer into the second page; and communicating the created message to the mail server.

* * * * *